United States Patent [19]

Stangeland

[11] Patent Number: 5,176,455
[45] Date of Patent: Jan. 5, 1993

[54] GRADATED HYDROSTATIC BEARING

[75] Inventor: Maynard L. Stangeland, Thousand Oaks, Calif.

[73] Assignee: Rockwell International Corporation, Seal Beach, Calif.

[21] Appl. No.: 732,245

[22] Filed: Jul. 18, 1991

[51] Int. Cl.⁵ .......................... F16C 33/04; F16C 32/06
[52] U.S. Cl. ..................................... 384/276; 384/100; 384/278; 384/907.1
[58] Field of Search .............. 384/100, 103, 114, 276, 384/278, 297, 907.1

[56] References Cited

U.S. PATENT DOCUMENTS

| | | | |
|---|---|---|---|
| 3,606,498 | 9/1971 | Ohno | 384/278 X |
| 4,075,364 | 2/1978 | Panzera | 427/34 |
| 4,169,637 | 10/1979 | Voitas | 384/276 X |
| 4,293,171 | 10/1981 | Kakumoto et al. | |
| 4,410,285 | 10/1983 | Strasser et al. | 384/907.1 X |

Primary Examiner—Thomas R. Hannon
Attorney, Agent, or Firm—H. Fredrick Hamann; Harry B. Field; David C. Faulkner

[57] ABSTRACT

A bearing assembly includes a bearing characterized by a gradated composition such that the bearing transitions from a metallic substrate such as high strength steel to an inner layer of silver, ceramics, or diamond-like material wherein the thermal coefficient of expansion as between the bearing and a rolling element or shaft is matched.

4 Claims, 1 Drawing Sheet

GRADATED HYDROSTATIC BEARING

BACKGROUND OF THE INVENTION

1. Field of the Invention

This invention relates to an improved functionally gradated hydrostatic bearing and a bearing assembly. It is particularly directed to an improvement in the composition of the bearing assembly accomplished by the use of a gradated matrix composite forming the bearing.

2. Background Art

The function of a hydrostatic bearing is to provide centering and/or axial position control of a rotating member with a hydrostatic fluid film. The hydrostatic fluid film prevents metal to metal contact between the rotating shaft and the stationary bearing, thereby providing unlimited operating life. There is, however, metal to metal relative motion during start and shut-down transients when the hydrostatic film is not developed.

Another requirement of the hydrostatic bearing is to have very small predictable operating clearances between the rotating shaft and stationary bearing. To satisfy both of these requirements, a material must be selected that is wear resistant, has a low coefficient of friction when contacting the rotating shaft, and is thermally compatible with the shaft material.

Various bearing assembly configurations are disclosed, such as for example, in the following documents incorporated by reference.

U.S. Pat. No. 4,075,364 of Feb. 21, 1978 describes porous ceramic seals capable of withstanding extreme differences in amounts of thermal expansion during, for example, turbine operation.

U.S. Pat. No. 4,293,171 of Oct. 6, 1981 describes an anti-friction bearing wherein at least one rolling element is coated with an intermediate metal layer such as by ion plating, said metal layer having lubricating properties.

However, it is heretofore unknown to provide, in a bearing assembly, a bearing which possesses inherent anti-friction properties and high wear resistance.

SUMMARY AND OBJECTS OF THE INVENTION

Accordingly, it is an object of the invention to provide an improved hydrostatic bearing.

A further object of the present invention is to provide a bearing having improved longevity, wear-resistance for start and shut-down rubbing, and a coefficient of expansion matched to that of the shaft and housing which contains the hydrostatic bearing.

Other advantages and objects of the present invention can be found in the bearing assembly described herein which provides for a bearing in which the bearing composition can be gradated from very low friction wear resistant material at the bearing to shaft interface to a corrosion resistant core material that matches the thermal coefficient of the surrounding hardware.

DESCRIPTION OF THE PREFERRED EMBODIMENT

Figure 1:
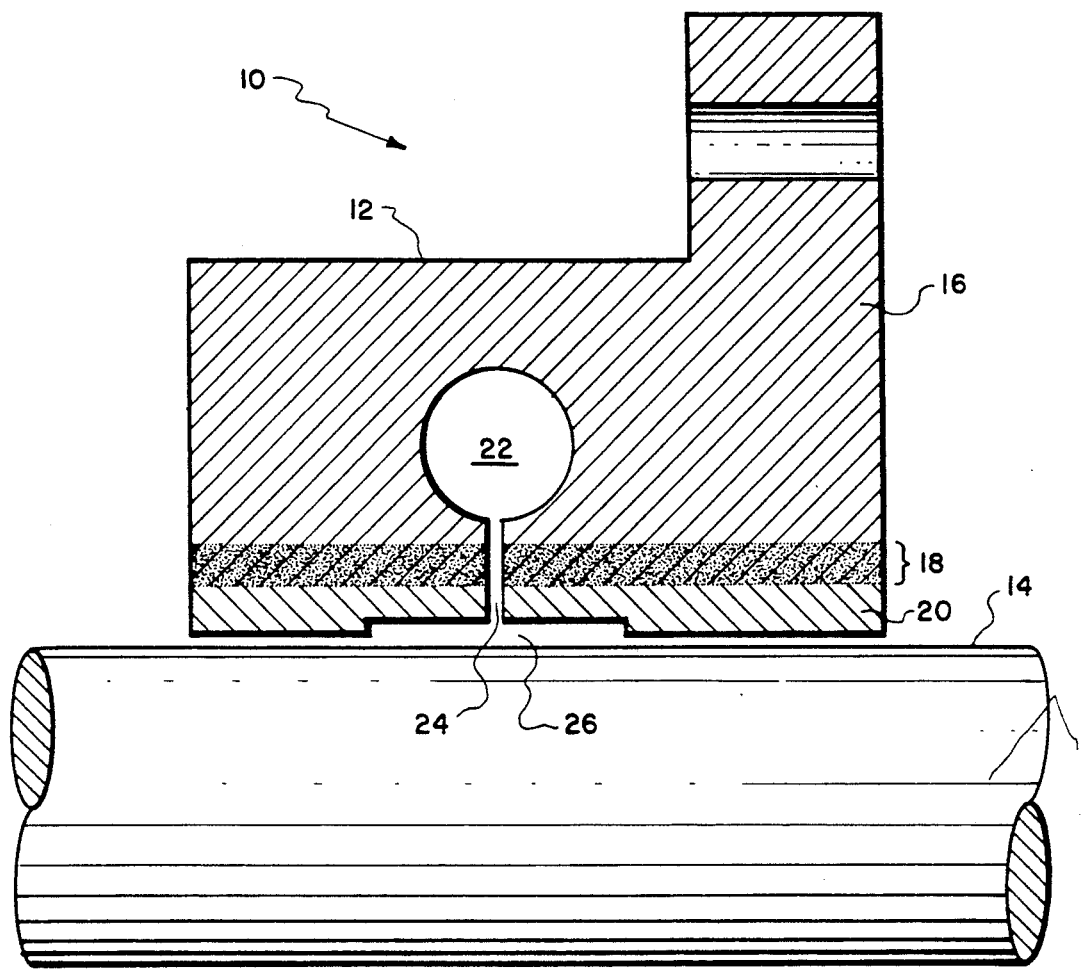
FIG. 1, the only FIGURE in the specification, discloses a preferred embodiment of a bearing according to the present invention.

FIG. 1 depicts the most preferred embodiment of a bearing according to the present invention further provided with a moving member or shaft to form a bearing assembly 10.

As shown, bearing 12 is in communicating association with a rotating element or shaft 14. The bearing is configured to have a metal sub-matrix layer 16 which may be formed of a corrosion resistant high strength steel. An intermediate matrix layer 18 having a mixed composition of the metal sub-matrix layer 16 and an inner ceramic matrix layer 20 of very low friction resistant material having a hardness intermediate the metal sub-matrix and the inner ceramic matrix layer is provided. The inner matrix layer 20, the surface of which contacts shaft 14, may be made of a low friction wear resistant material such as silicon nitride, silver, carbon, or diamond like material.

Bearing assembly 10 is further provided with annular manifold 22 for supplying high pressure hydrostatic fluid through orifice 24 to bearing recess pads 26. Manifold 22 is integrally formed during assembly 10 fabrication, thereby eliminating separate manifold and seal machining.

In operation, a bearing assembly according to the present invention will provide a bearing having a low friction, wear resistant capacity for transient rubbing and corrosion resistance for applications such as in cryogenic turbopumps, and the like. More specifically, the gradated composition of the bearing described is such that it has a thermal coefficient of expansion matched to that of the shaft or rotating element 14.

The functionally gradiated bearing can be formed by vacuum plasma spraying (VPS), physical vapor depositor (PVD) or other similar processes suitable for depositing material.

What is claimed is:

1. A bearing comprising:
   (a) a metal sub-matrix layer; and
   (b) an intermediate metallic matrix layer having a hardness intermediate the metal sub-matrix layer and an inner ceramic matrix layer of very hard friction resistant material, the surface of which contacts a rotating element, said bearing characterized in having a thermal coefficient of expansion matched to that of the rotating element.

2. The bearing of claim 1 in which the metal sub-matrix layer is a corrosion resistant high strength steel.

3. The bearing of claim 1 in which the inner matrix layer is a low coefficient, wear resistant material, such as silver, silicon nitride, or carbon.

4. The bearing of claim 1 further comprising an annular manifold for supplying high pressure fluid to bearing orifices said manifold integrally formed as part of the bearing.

* * * * *